United States Patent
Vijaya Kumar et al.

(10) Patent No.: US 11,003,195 B2
(45) Date of Patent: May 11, 2021

(54) METHOD TO PRIORITIZE THE PROCESS OF RECEIVING FOR COOPERATIVE SENSOR SHARING OBJECTS

(71) Applicant: GM Global Technology Operations LLC, Detroit, MI (US)

(72) Inventors: Vivek Vijaya Kumar, Shelby Township, MI (US); Hariharan Krishnan, Troy, MI (US); Bo Yu, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 288 days.

(21) Appl. No.: 16/288,375

(22) Filed: Feb. 28, 2019

(65) Prior Publication Data

US 2020/0278693 A1 Sep. 3, 2020

(51) Int. Cl.
| | |
|---|---|
| *H04W 4/46* | (2018.01) |
| *H04W 4/48* | (2018.01) |
| *H04W 4/44* | (2018.01) |
| *G05D 1/00* | (2006.01) |
| *G08G 1/16* | (2006.01) |
| *G01S 11/00* | (2006.01) |
| *G08G 5/04* | (2006.01) |
| *H04W 4/40* | (2018.01) |
| *G05D 1/02* | (2020.01) |
| *G06K 9/00* | (2006.01) |

(Continued)

(52) U.S. Cl.
CPC ....... *G05D 1/0289* (2013.01); *G06K 9/00201* (2013.01); *G06K 9/6289* (2013.01); *H04W 4/027* (2013.01); *H04W 4/46* (2018.02)

(58) Field of Classification Search
CPC .... G05D 1/0289; G05D 1/00; G06K 9/00201; G06K 9/6289; G06K 9/00979; G06K 9/00993; G06K 2209/23; G06K 9/00805; H04W 4/46; H04W 4/027; H04W 4/40; H04W 4/44; H04W 4/48; G08G 1/00; G08G 1/015; G08G 1/087; G08G 1/16; G05B 2219/39082; G05B 2219/39091; G05B 2219/40317
See application file for complete search history.

(56) References Cited

U.S. PATENT DOCUMENTS

| | | | |
|---|---|---|---|
| 10,659,991 B2 * | 5/2020 | Pedersen | G06T 1/0007 |
| 2009/0121851 A1 * | 5/2009 | Abe | G06T 3/4038 |
| | | | 340/435 |

(Continued)

*Primary Examiner* — Yonel Beaulieu
(74) *Attorney, Agent, or Firm* — Quinn IP Law

(57) ABSTRACT

A method includes receiving object data, by a controller of a host vehicle, from a plurality of sources, the plurality of sources including remote objects and a sensor system of the host vehicle; identifying, by the controller of the host vehicle, a target object using the object data from the plurality of sources, the object data including a target-object data, and the target-object data is the object data that specifically pertains to the target object determining, by the controller, that the target-object data is available from more than one of the plurality of sources; and in response to determining that the target-object data is available from more than one of the plurality of sources, fusing, by the controller, the target-object data that is available from more than one of the plurality of sources to create a single dataset about the target object.

20 Claims, 5 Drawing Sheets

(51) Int. Cl.
  *H04W 4/02* (2018.01)
  *G06K 9/62* (2006.01)

(56) References Cited

U.S. PATENT DOCUMENTS

| | | | |
|---|---|---|---|
| 2017/0248953 A1* | 8/2017 | Kelley | B60W 50/08 |
| 2020/0028736 A1* | 1/2020 | Park | H04L 43/0817 |
| 2020/0068434 A1* | 2/2020 | Pedersen | G06T 5/002 |
| 2020/0118451 A1* | 4/2020 | Dawson-Townsend | G08G 5/0091 |
| 2020/0225673 A1* | 7/2020 | Ebrahimi Afrouzi | G05D 1/0214 |
| 2020/0284883 A1* | 9/2020 | Ferreira | G01S 7/4816 |
| 2020/0391760 A1* | 12/2020 | Reschke | B60Q 1/525 |

* cited by examiner

METHOD TO PRIORITIZE THE PROCESS OF RECEIVING FOR COOPERATIVE SENSOR SHARING OBJECTS

INTRODUCTION

The present disclosure relates to a method and system for prioritizing the processing of received cooperating sensor sharing objects.

In cooperative sensor sharing, the remote vehicles and/or remote infrastructure share sensed data about sensed objects (including themselves) with a host vehicle. Cooperative sensor sharing is a wireless transmission of sensor information to neighboring users (other vehicles) for cooperative information, which is bandwidth intensive. A vehicle may receive information about a sensed object from multiple neighboring users. Processing this information from the users are redundant and computationally very intensive. To efficiently use computational resources, the present disclosure describes a method of prioritizing the processing of information received from cooperative sensor sharing system and prioritize object processing to minimize computation.

By employing this method, the controller of the host vehicle detects redundant sensor information from a cooperative sharing system/network. The presently described method also improves system computational capability by prioritizing sensor object based on object relevance and object importance.

In one aspect of the present disclosure, the method to control the host vehicle includes receiving object data, by a controller of the host vehicle, from a plurality of sources, the plurality of sources including remote objects and a sensor system of the host vehicle, the sensor system is in communication with the controller, the sensor system includes a plurality of sensors, the sensor system sends internal object data to the controller, the remote objects send external object data to the controller of the host vehicle, the external object data includes cooperative sensing messages (CSMs) from the remote objects; identifying, by the controller of the host vehicle, a target object using the object data from the plurality of sources, the object data including a target-object data, and the target-object data is the object data that specifically pertains to the target object determining, by the controller, that the target-object data is available from more than one of the plurality of sources; and in response to determining that the target-object data is available from more than one of the plurality of sources, fusing, by the controller, the target-object data that is available from more than one of the plurality of sources to create a single dataset about the target object.

The target-object data may include object location data that is indicative of a location of the target object. Identifying, by the controller, the target object may include using the object location data and a bounding box to identify the target object. The method may further include marking the target object as redundant in response to determining that the target-object data is available from more than one of the plurality of sources. The external object data may include Basic Safety Messages (BSMs) and cooperative sensing messages (CSMs) from the remote objects. The method may further include determining that the target object is moving in the same direction as the host vehicle.

The method may further include: determining and monitoring a proximity of the target object to the host vehicle, wherein the proximity of the target object to the host vehicle is a distance from the target object to the host vehicle; determining a probability that the target object will physically contact the host vehicle; and assigning a first priority level based on the proximity of the target object to the host vehicle and the probability that the target object will physically contact the host vehicle to the host vehicle in response to determining that the target object is moving in the same direction as the host vehicle.

The method may further include incrementing the first priority level based on a type of the target object. The method may further include determining that the target object in not moving in the same direction as the host vehicle. The method may further include determining that the target object is approaching the host vehicle in response to determining that the target object is not moving in the same direction as the host vehicle. The method may further include assigning a second priority level for the target object in response to determining that the target object is approaching the host vehicle; determining a type of the target object; and incrementing the second priority level based on the type of the target object. The method may further include determining that the target object is not approaching the host vehicle in response to determining that the target object is not moving in the same direction as the host vehicle. The method may further include assigning a third priority level in response to determining that the target object is not approaching the host vehicle; determining a type of the target object; and incrementing the third priority level based on the type of the target object. The method may further include removing the target object from a current processing cycle in response to assigning the third priority level.

The present disclosure also describes a host vehicle. In one aspect of the present disclosure, the host vehicle includes a communication system, a controller in communication with the communication system, wherein the controller is configured to receive external object data from remote objects, a sensor system is in communication with the controller. The sensor system includes a plurality of sensors and is configured to send object location data to the controller. The external object data include cooperative sensing messages (CSMs) from the remote objects. The controller is programmed to: identify a target object based on internal object data received from the sensor system of the host vehicle, wherein the sensing system includes a plurality of sensors, and the internal object data includes internal location data; receive external object data from remote objects to identify the target object, the external object data includes external location data about the target object, the external object data include cooperative sensing messages (CSMs) from the remote objects, and the remote objects include remote vehicles; determine that the internal object data about the target object is the same as the external object data about the target object; and in response to determining that the internal object data about the target object is the same as the external object data about the target object, fuse the internal object data about the target object and the external object data about the target object to create a single dataset about the target object.

The controller may be programmed to identify the target object by using the object location data and a bounding box to identify the target object. The controller may be further programmed to identify the target object as redundant in response to determining that the internal object data about the target object is the same as the external object data about the target object. The external object data may include a Basic Safety Message (BSM) and cooperative sensing message (CSM) from the remote objects. The controller may be further programmed to determine that the target object is moving in the same direction as the host vehicle.

The present disclosure describes a system with associated infrastructure that enables the vehicle operator to make an informed decision on his or her choice between the range and feature availability.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

The following detailed description is merely exemplary in nature and is not intended to limit the application and uses. Furthermore, there is no intention to be bound by expressed or implied theory presented in the preceding technical field, background, brief summary or the following detailed description. As used herein, the term "module" refers to hardware, software, firmware, electronic control component, processing logic, and/or processor device, individually or in a combination thereof, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

Figure 1:
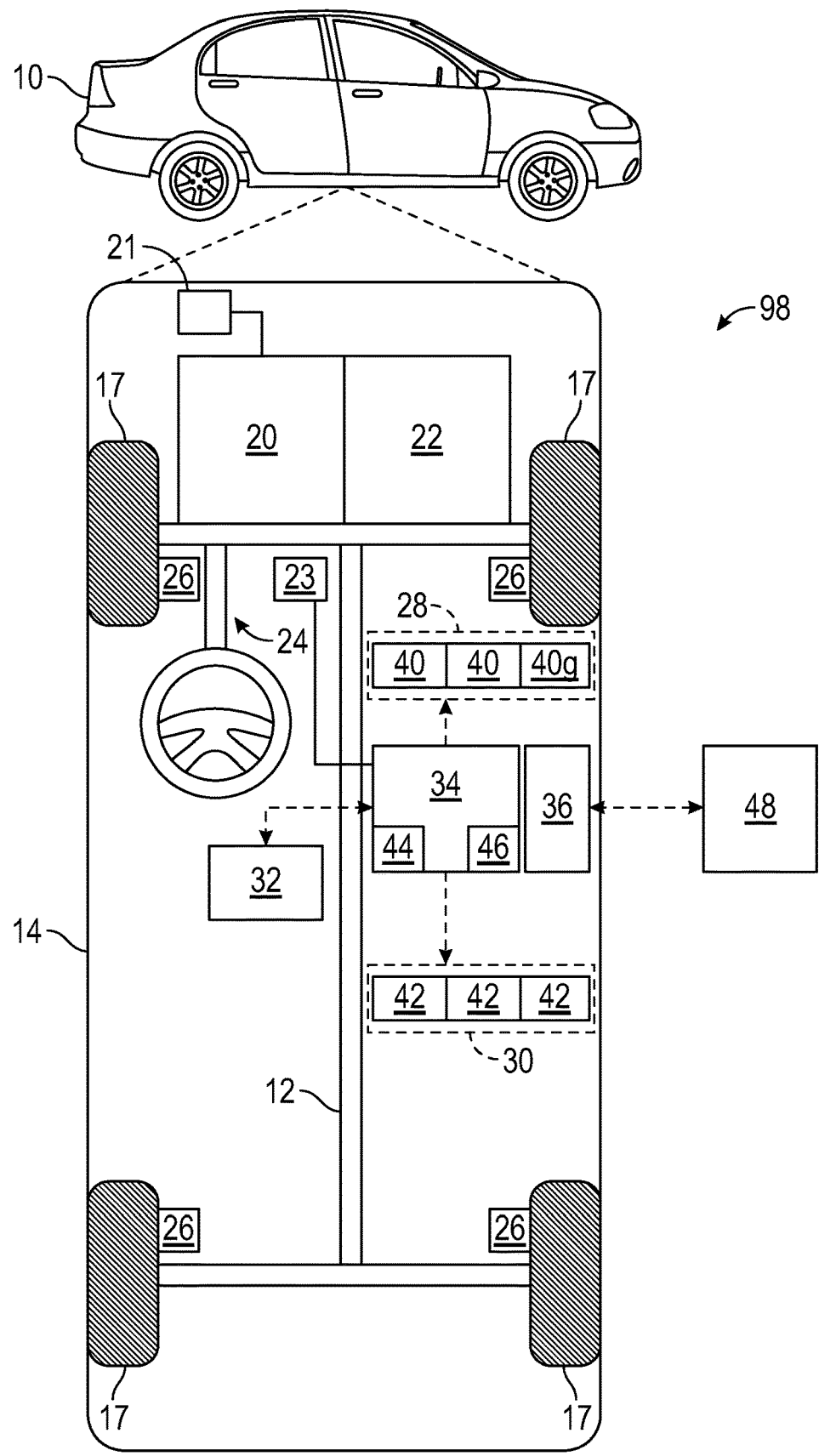
FIG. 1 is a schematic block diagram of a vehicle.

As depicted in FIG. 1, the vehicle 10 generally includes a chassis 12, a body 14, front and rear wheels 17 and may be referred to as the host vehicle. The body 14 is arranged on the chassis 12 and substantially encloses components of the vehicle 10. The body 14 and the chassis 12 may jointly form a frame. The wheels 17 are each rotationally coupled to the chassis 12 near a respective corner of the body 14.

In various embodiments, the vehicle 10 may be an autonomous vehicle and a control system 98 is incorporated into the vehicle 10. The vehicle 10 is, for example, a vehicle that is automatically controlled to carry passengers from one location to another. The vehicle 10 is depicted in the illustrated embodiment as a passenger car, but it should be appreciated that another vehicle including motorcycles, trucks, sport utility vehicles (SUVs), recreational vehicles (RVs), marine vessels, aircraft, etc., can also be used. In an exemplary embodiment, the vehicle 10 is a so-called Level Four or Level Five automation system. A Level Four system indicates "high automation", referring to the driving mode-specific performance by an automated driving system of aspects of the dynamic driving task, even if a human driver does not respond appropriately to a request to intervene. A Level Five system indicates "full automation", referring to the full-time performance by an automated driving system of aspects of the dynamic driving task under a number of roadway and environmental conditions that can be managed by a human driver.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an electric machine such as a traction motor and/or a fuel cell propulsion system. The vehicle 10 further includes a battery (or battery pack) 21 electrically connected to the propulsion system 20. Accordingly, the battery 21 is configured to store electrical energy and to provide electrical energy to the propulsion system 20. Additionally, the propulsion system 20 may include an internal combustion engine. The transmission system 22 is configured to transmit power from the propulsion system 20 to the vehicle wheels 17 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 17. The brake system 26 may, in various embodiments, include friction brakes, brake by wire, a regenerative braking system such as an electric machine, and/or other appropriate braking systems. The steering system 24 influences a position of the vehicle wheels 17. While depicted as including a steering wheel for illustrative purposes, in some embodiments contemplated within the scope of the present disclosure, the steering system 24 may not include a steering wheel.

The sensor system 28 includes one or more sensors 40 (i.e., sensing devices) that sense observable conditions of the exterior environment and/or the interior environment of the vehicle 10. The sensors 40 may include, but are not limited to, radars, lidars, global positioning systems, optical cameras, thermal cameras, ultrasonic sensors, and/or other sensors. The actuator system 30 includes one or more actuator devices 42 that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered). The sensing system 24 includes one or more Global Positioning System (GPS) transceiver 40g configured to detect and monitor the route data (i.e., route information). The GPS transceiver 40g is configured to communicate with a GPS to locate the position of the vehicle 10 in the globe. The GPS transceiver 40g is in electronic communication with the controller 34. Because the sensor system 28 provides object data to the controller 34, the sensory system 28 and its sensors 40 are considered sources of information (or simply sources).

The data storage device 32 stores data for use in automatically controlling the vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer non-transitory readable storage device or media 46. The processor 44 can be a custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of known memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although a single controller 34 is shown in FIG. 1, embodiments of the vehicle 10 may include a number of controllers 34 that communicate over a suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the control system 98 and. The vehicle 10 includes a user interface 23, which may be a touchscreen in the dashboard. The user interface 23 is in electronic communication with the controller 34 and is configured to receive inputs by a user (e.g., vehicle operator). Accordingly, the controller 34 is configured receive inputs from the user via the user interface 23. The user interface 23 includes a display configured to display information to the user (e.g., vehicle operator or passenger).

Figure 2:
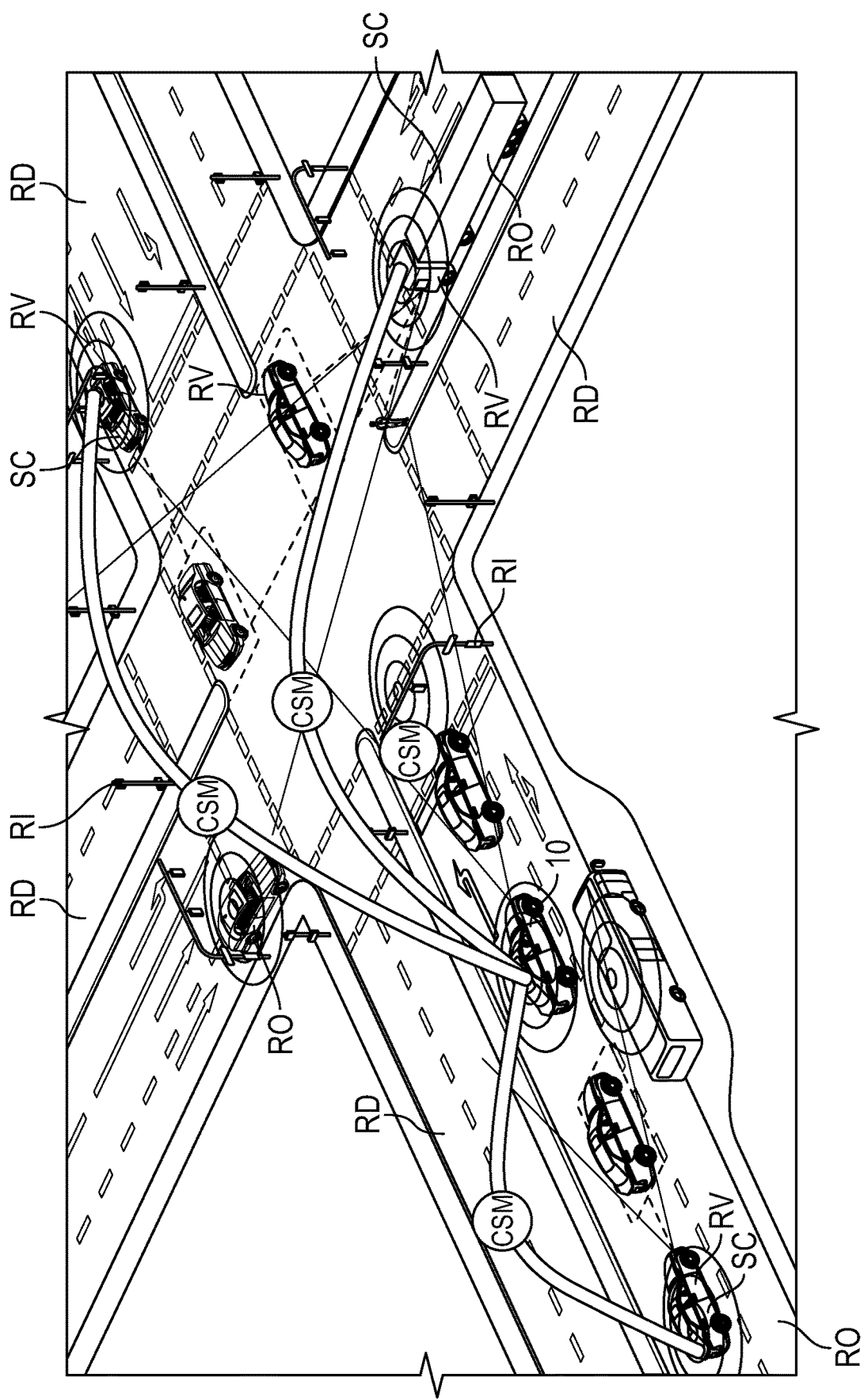
FIG. 2 is a schematic diagram of a vehicle receiving remote object data from remote objects.

The communication system 36 is configured to wirelessly communicate information to and from other entities 48, such as but not limited to, other vehicles ("V2V" communication), infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication system 36 may include one or more antennas and/or transceivers for receiving and/or transmitting signals, such as cooperative sensing messages (CSMs).

FIG. 1 is a schematic block diagram of the control system 98, which is configured to control the vehicle 10. The controller 34 of the control system 98 is in electronic communication with the braking system 26, the propulsion system 20, and the sensor system 28. The braking system 26 includes one or more brake actuators (e.g., brake calipers) coupled to one or more wheels 17. Upon actuation, the brake actuators apply braking pressure on one or more wheels 17 to decelerate the vehicle 10. The propulsion system 20 includes one or more propulsion actuators for controlling the propulsion of the vehicle 10. For example, as discussed above, the propulsion system 20 may include an internal combustion engine and, in that case, the propulsion actuator may be a throttle specially configured to control the airflow in the internal combustion engine. The sensor system 28 may include one or more accelerometers (or one or more gyroscopes) coupled to one or more wheels 17. The accelerometer is in electronic communication with the controller 34 and is configured to measure and monitor the longitudinal and lateral accelerations of the vehicle 10. The sensor system 28 may include one or more speed sensors configured to measure the speed (or velocity) of the vehicle 10. The speed sensor is coupled to the controller 34 and is in electronic communication with one or more wheels 17.

With reference to FIG. 2, the communication system 36 allows the vehicle 10 (i.e., the host vehicle) to receive and/or transmit CSMs to sense remote objects RO, such as the remote vehicles RV, remote infrastructure RI, and/or vulnerable road users (VRUs). The remote infrastructure RI may include traffic symbols and/or traffic signs (e.g., a stop sign, a traffic light, etc.). The remote vehicles RV may sense other remote vehicles and/or remote infrastructure, such as traffic signs, using its sensors (i.e., optical cameras). The remote objects RO, such as the remote vehicles RV or the remote infrastructure RI, send the CSMs to the vehicle 10.

The CSMs may include object data. The object data may also be Basic Safety Messages (BSMs). Because the remote objects (e.g., remote vehicles RVs and remote infrastructure RI) send messages to the vehicle 10, the remote objects RO are considered sources of information (or simply sources SC). The object data may include, among other things, class data and external location data. The location data is indicative of the location (in real time) of the sensed remote object RO. Because the location of the sensed remote object (e.g., remote vehicle RV) is monitored in real time, the controller 34 is programmed to determine the speed of the sensed remote object. A remote vehicle RV may include one or more of the components of the vehicle 10 (i.e., host vehicle), such as the communication system 36 and the sensor system 28. The class data is indicative of the object class of the sensed remote object. The object class includes a vulnerable road user (VRU) class, a vehicle class (e.g., emergency vehicle), a traffic sign class, and another class. The vehicle class designates vehicles (i.e., remote vehicles RV). The VRU class designates, among other things, pedestrians and cyclists. The traffic sign class designates traffic signs and traffic symbols. The other class designates other sensed objects or conditions, such as weather conditions (e.g., fog, rain, snow) and/or road conditions (e.g., traffic accidents, wet roads, etc.).

Figure 3:
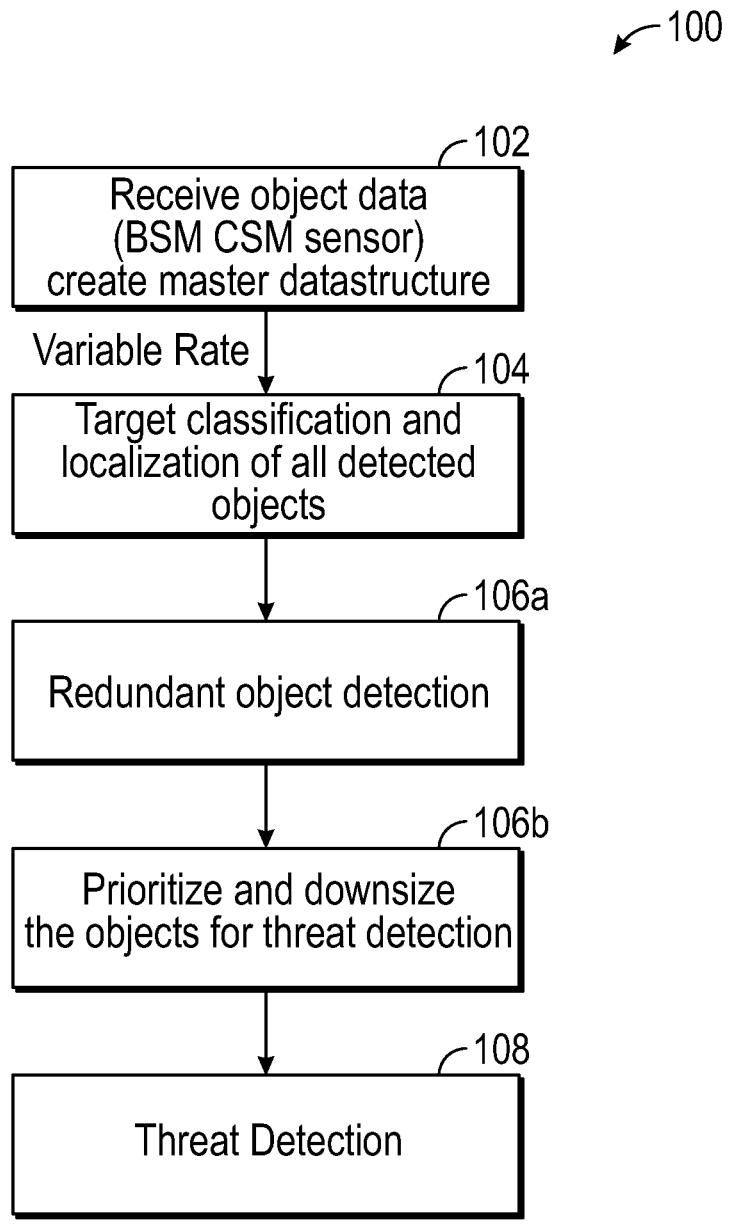
FIG. 3 is a flowchart of a method for controlling the vehicle of FIG. 1.

FIG. 3 is a flowchart of a method 100 to control the vehicle 10 by prioritizing the processing of object data. The method 100 begins at block 102. At block 102, the controller 34 of the vehicle 10 receives object data from a plurality of sources SC (FIG. 2). The sources SC include remote objects RO, such as the remote infrastructure RO and the remote vehicles RV, and the sensor system 28. As discussed above, the sensor system 28 is in communication with the controller 34 and a plurality of sensors 40. The sensor system 28 detects remote objects RO using the sensors 40, such as the optical cameras, and sends internal object data to the controller 34. The term 'internal object data" means data about remote objects RO that originates from the sensor system 28 of the vehicle 10. The internal object data includes internal location data that is indicative of the location of the vehicle 10 or a remote object RO. The remote objects RO may have their own sensor system (including sensors) and send external object data to the controller 34 of the vehicle 10. The term "external object data" include cooperative sensing messages (CSMs) and Basic Safety Messages (BSMs) from the remote objects RO. The term "basic safety message" means a packet of data that contains information about the position, heading, speed, and other information relating to a remote vehicle RV's state and predicted path. The object data may be received by the controller 34 at a variable rate. After executing block 102, the method 100 proceeds to block 104.

At block 104, the controller 34 classifies a target object and locates the detected remote objects RO using the object data received from the sensor system 28 and the external object data received from the remote objects RO. Then, the method 100 proceeds to block 106. At block 106a, the controller 34 detects redundant object data that is available from more than one source SC (e.g., sensor system 28 and remote objects ROs) at subroutine 106a. At subroutine 106b, the controller 34 prioritizes and downsizes the object data for threat detection. Then, the method 100 proceeds to block 108. At block 108, the controller 34 launches several Threat Detection applications with the prioritized object data. The Threat Detection applications may include but are not limited to: Forward Collision Warning (FCW), Blind-side Warning (BSW), and Do Not Pass Warning (DNPW), etc.

Figure 4:
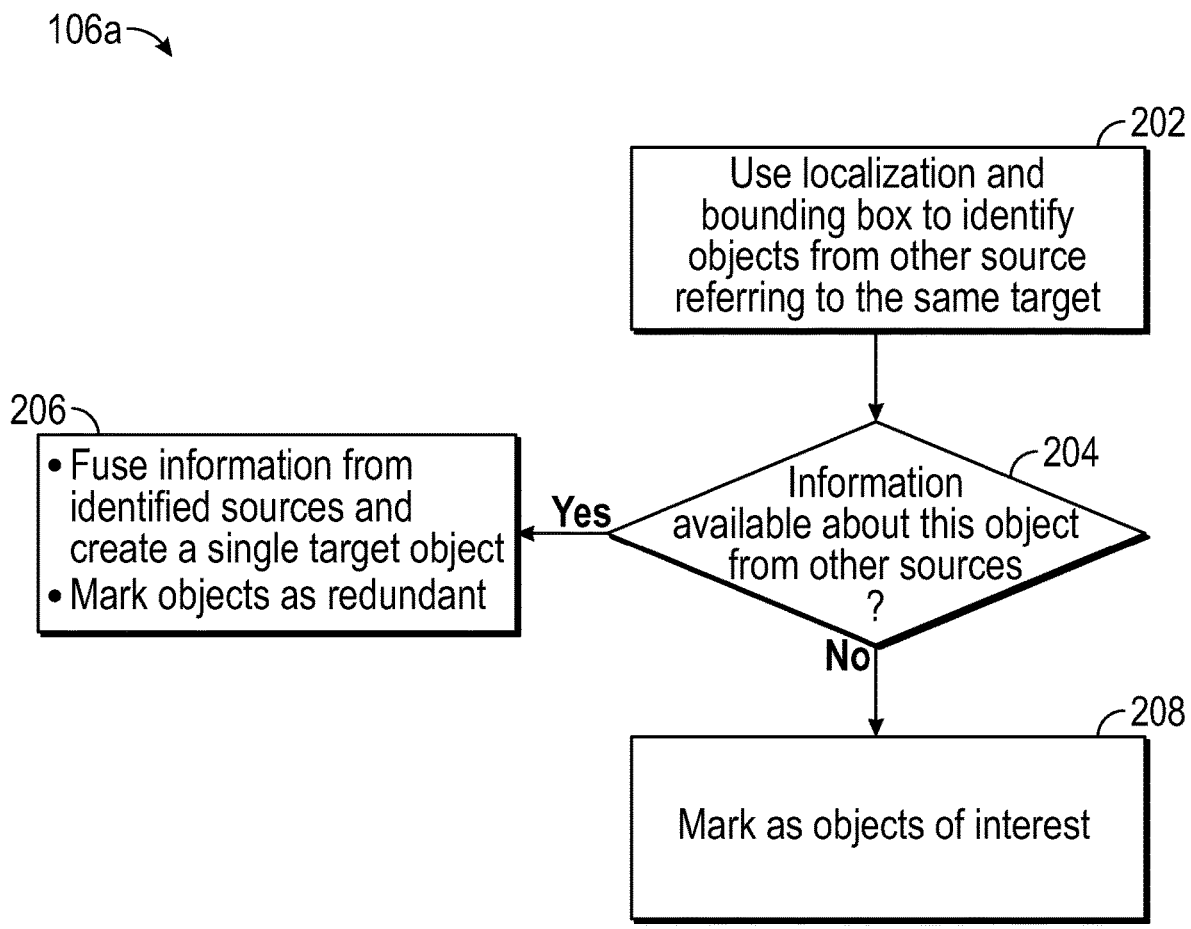
FIG. 4 is a flowchart of a subroutine of the method of FIG. 3.

FIG. 4 is a flowchart of the subroutine 106a described above. The subroutine 106a is looped through the detected remote objects RO and begins at block 202. At block 202, the controller 34 identifies a target object using the object data from the plurality of sources SC (FIG. 2). The object data includes a target-object data, and the target-object data is the object data that specifically pertains to the target object. The target-object data includes object location data that is indicative of a location of the target object (e.g., a target remote vehicle RV or a target remote infrastructure RI). The controller 34 may identify the target object using the internal location data (from the sensor system 28) and a bounding box (from the sensor system 28) to identify the target object that is also detected using the external object data. Then, the subroutine 106a proceeds to block 204.

At block 204, the controller 34 reads the external object data and the internal object data to determine whether the target-object data is available from more than one of the plurality of sources. In other words, the controller 34 determines whether the same object data for the target object is available from multiple sources. If the controller 34 determines that the same object data for the target object is available from multiple sources SC, then the subroutine 106a continues to block 206. At block 206, the controller 34 fuses the target-object data that is available from more than one of the plurality of sources SC to create a single dataset about the target object in response to determining that the target-object data is available from more than one of the plurality of sources SC. Also at block 206, the controller 34 marks the target object as a redundant object in response to determining that the target-object data is available from more than one of the plurality of sources SC. If the controller 34 determines that the same object data for the target object is not available from multiple sources SC, then the subroutine 106a continues to block 208. At block 208, the controller 34 marks the target object as an object of interest (i.e., a non-redundant object).

Figure 5:
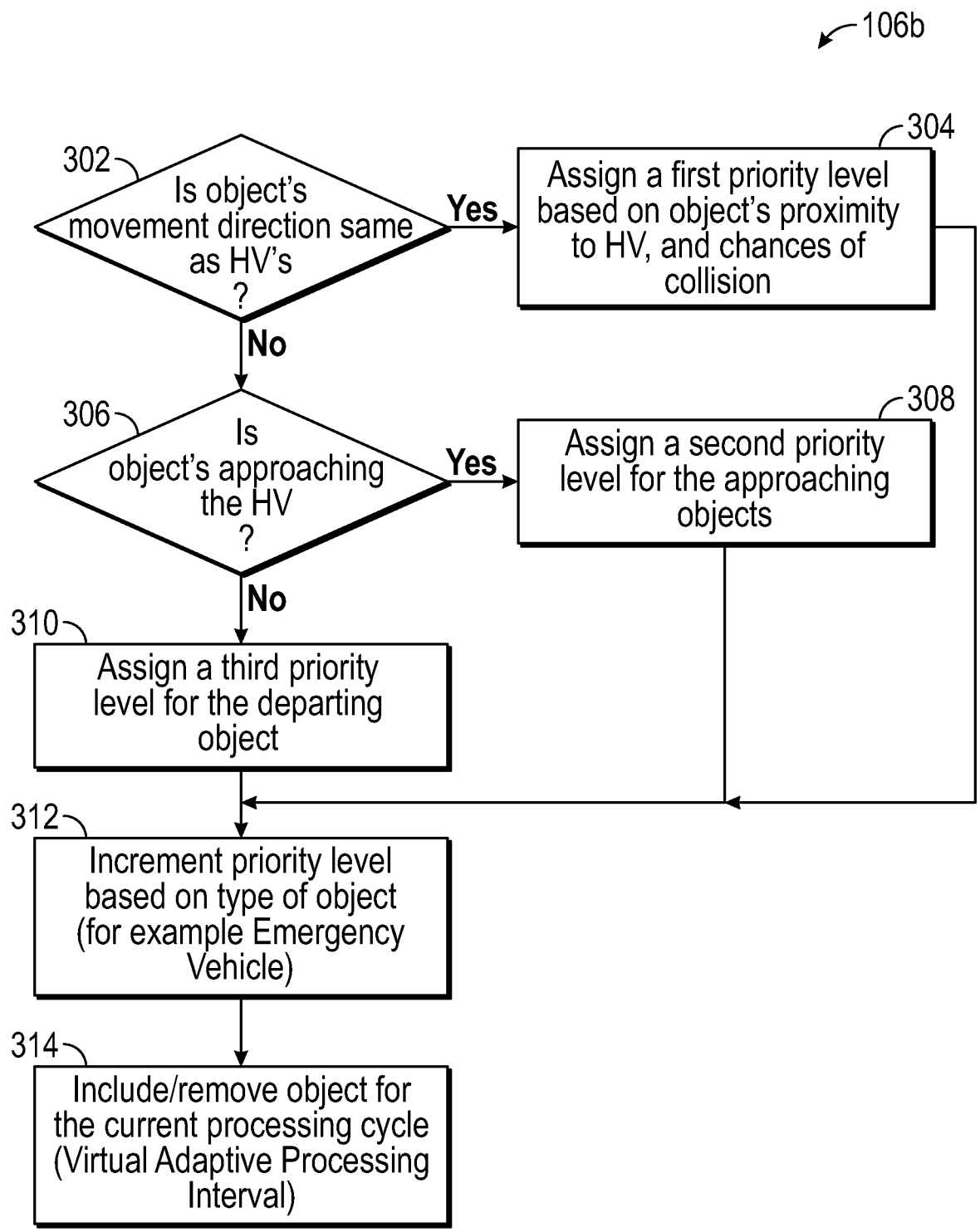
FIG. 5 is a flowchart of another subroutine of the method of FIG. 3.

FIG. 5 is a flowchart of subroutine 106b for prioritizing and downsizing remote objects RO for threat detection. The subroutine 106b begins at block 302. At block 302, the controller 34 determines that the target object is moving in the same direction as the vehicle 10. To determine the movement direction of the vehicle 10, the controller 34 receives data from the sensor system 28 and the sensor system 28 may use one or sensors 40, such as the radars, lidars, global positioning systems, optical cameras, thermal cameras, ultrasonic sensors, and/or other sensors. To determine movement direction of the remote object, the target object sends the target-object data, which includes data relating to the remote object's movement direction. If the target object is moving in the same direction as the vehicle 10, then the subroutine 106b proceeds to block 304. If the target object is not moving in the same direction as the vehicle 10, then the subroutine 106b proceeds to block 306.

At block 304, the controller 34 determines and monitors the proximity of the target object to the vehicle 10 using one or more sensors 40 (e.g., lidar) of the sensor system 28. The proximity of the target object to the vehicle 10 is the distance from the target object to the vehicle 10. At block 304, the controller 34 also determines (e.g., calculates) the probability that the target object will physically contact the vehicle 10. At block 304, the controller 34 also assigns a first priority level based on the proximity of the target object to the vehicle 10 and the probability that the target object will physically contact the host vehicle in response to determining that the target object is moving in the same direction as the vehicle 10.

If the target object is not moving in the same direction as the vehicle 10, then the subroutine 106b proceeds to block 306. At block 306, the controller 34 determines whether the target object is approaching the vehicle 10 using the sensors 40 or the remote object data, such as the lidar, in response to determining that the target object is not moving in the same direction as the vehicle 10. If the target object is approaching the vehicle 10, then the subroutine 106b proceeds to block 308. At block 308, the controller 34 assigns a second priority level for the target object in response to determining that the target object is approaching the vehicle 10. If the target object is not approaching the vehicle 10, then the subroutine 106b proceeds to block 310. At block 310, the controller 34 assigns a third priority level in response to determining that the target object is not approaching the host vehicle. After block 304, 308, or 310, the subroutine 106b proceeds to block 312. The first, second, and third priority levels are different from one another.

At block 312, controller 34 determines the type (or class) of the target object using the object data. The target object data includes a target class data. The target class data is indicative of the type of the target object. For instance, the target class data may indicate that the target object is an emergency vehicle. The term "emergency vehicle" means a vehicle used for an emergency, such as an ambulance, a police car or a fire truck. At block 312, the controller 34 also increments the appropriate priority level (e.g., the first, second, or third priority level) based on the type of the target vehicle. For example, the appropriate priority level (e.g., the first, second, or third priority level) may be a significant increase in response to determining that the vehicle 10 is the emergency vehicle. At block 314, the controller 34 includes or removes remote objects RO for the current processing cycle (i.e., analysis) based on the determined priority level (i.e., first, second, or third priority level plus the increment at block 312) through a virtual adaptive processing in order to save computational resources.

The detailed description and the drawings or figures are a supportive description of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method to control a host vehicle, comprising:
receiving object data, by a controller of the host vehicle, from a plurality of sources, the plurality of sources including remote objects and a sensor system of the host vehicle, the sensor system is in communication with the controller, the sensor system includes a plurality of sensors, the sensor system sends internal object data to the controller, the remote objects send external object data to the controller of the host vehicle, the external object data include cooperative sensing messages (CSMs) from the remote objects;
identifying, by the controller of the host vehicle, a target object using the object data from the plurality of sources, the object data including a target-object data, and the target-object data is the object data that specifically pertains to the target object;
determining, by the controller, that the target-object data is available from more than one of the plurality of sources; and
in response to determining that the target-object data is available from more than one of the plurality of sources, fusing, by the controller, the target-object data that is available from more than one of the plurality of sources to create a single dataset about the target object.

2. The method of claim 1, wherein:
the target-object data includes object location data that is indicative of a location of the target object; and
identifying, by the controller, the target object includes using the object location data and a bounding box to identify the target object.

3. The method of claim 2, further comprising marking the target object as redundant in response to determining that the target-object data is available from more than one of the plurality of sources.

4. The method of claim 3, wherein the external object data includes Basic Safety Messages (BSMs) and cooperative sensing messages (CSMs) from the remote objects.

5. The method of claim 4, further comprising determining that the target object is moving in the same direction as the host vehicle.

6. The method of claim 5, further comprising:
determining and monitoring a proximity of the target object to the host vehicle, wherein the proximity of the target object to the host vehicle is a distance from the target object to the host vehicle;
determining a probability that the target object will physically contact the host vehicle; and
assigning a first priority level based on the proximity of the target object to the host vehicle and the probability that the target object will physically contact the host vehicle in response to determining that the target object is moving in the same direction as the host vehicle.

7. The method of claim 6, further comprising incrementing the first priority level based on a type of the target object.

8. The method of claim 4, further comprising determining that the target object in not moving in the same direction as the host vehicle.

9. The method of claim 8, further comprising determining that the target object is approaching the host vehicle in response to determining that the target object is not moving in the same direction as the host vehicle.

10. The method of claim 9, further comprising:
assigning a second priority level for the target object in response to determining that the target object is approaching the host vehicle;
determining a type of the target object; and
incrementing the second priority level based on the type of the target object.

11. The method of claim 8, further comprising determining that the target object is not approaching the host vehicle in response to determining that the target object is not moving in the same direction as the host vehicle.

12. The method of claim 11, further comprising:
assigning a third priority level in response to determining that the target object is not approaching the host vehicle;
determining a type of the target object; and
incrementing the third priority level based on the type of the target object.

13. The method of claim 12, further comprising removing the target object from a current processing cycle in response to assigning the third priority level.

14. A host vehicle, comprising:
a communication system;
a controller in communication with the communication system, wherein the controller is configured to receive external object data from remote objects;

a sensor system is in communication with the controller, the sensor system including a plurality of sensors, the sensor system sends object location data to the controller, the external object data include cooperative sensing messages (CSMs) from the remote objects;

wherein the controller is programmed to:

identify a target object based on internal object data received from the sensor system of the host vehicle, wherein the sensing system includes a plurality of sensors, and the internal object data includes internal location data;

receive external object data from remote objects to identify the target object, the external object data includes external location data about the target object, the external object data include cooperative sensing messages (CSMs) from the remote objects, and the remote objects include remote vehicles;

determine that the internal object data about the target object is the same as the external object data about the target object; and in response to determining that the internal object data about the target object is the same as the external object data about the target object, fuse the internal object data about the target object and the external object data about the target object to create a single dataset about the target object.

15. The host vehicle of claim 14, wherein the controller is programmed to identify the target object by using the object location data and a bounding box to identify the target object.

16. The host vehicle of claim 15, wherein the controller is further programmed to identify the target object as redundant in response to determining that the internal object data about the target object is the same as the external object data about the target object.

17. The host vehicle of claim 16, wherein the external object data includes a Basic Safety Message (BSM) and cooperative sensing message (CSM) from the remote objects.

18. The host vehicle of claim 17, wherein the controller is further programmed to determine that the target object is moving in the same direction as the host vehicle.

19. The host vehicle of claim 18, wherein the controller is further programmed to:

determine and monitoring a proximity of the target object to the host vehicle, wherein the proximity of the target object to the host vehicle is a distance from the target object to the host vehicle;

determine a probability that the target object will physically contact the host vehicle;

assign a first priority level as a function of the proximity of the target object and the probability the target object will physically contact the host vehicle in response to determining that the target object is moving in the same direction as the host vehicle; and increment the first priority level based on a type of the target object.

20. The host vehicle of claim 19, wherein the controller is programmed to:

determine that the target object in not moving in the same direction as the host vehicle;

determine that the target object is approaching the host vehicle in response to determining that the target object is not moving in the same direction as the host vehicle;

assign a first priority level for the target object in response to determining that the target object is approaching the host vehicle;

determining that the target object is an emergency vehicle, wherein the emergency vehicle is an ambulance; and increment the first priority level in response to determining that the host vehicle is the emergency vehicle.

* * * * *